US009266436B2

(12) United States Patent
Nitti

(10) Patent No.: US 9,266,436 B2
(45) Date of Patent: Feb. 23, 2016

(54) ICE BREAKING PANTOGRAPH

(71) Applicant: TESMEC S.P.A., Milan (IT)

(72) Inventor: Antonio Nitti, Castellana Grotte (IT)

(73) Assignee: TESMEC S.P.A., Milan (IT)

( * ) Notice: Subject to any disclaimer, the term of this patent is extended or adjusted under 35 U.S.C. 154(b) by 158 days.

(21) Appl. No.: 14/150,586

(22) Filed: Jan. 8, 2014

(65) Prior Publication Data
US 2014/0202817 A1    Jul. 24, 2014

(30) Foreign Application Priority Data

Jan. 18, 2013 (IT) .............................. MI2013A0064

(51) Int. Cl.
*B60L 5/24* (2006.01)
*B60L 5/02* (2006.01)
*B60L 5/26* (2006.01)

(52) U.S. Cl.
CPC ... *B60L 5/24* (2013.01); *B60L 5/02* (2013.01); *B60L 5/26* (2013.01); *B60L 2200/26* (2013.01)

(58) Field of Classification Search
CPC ............... B60L 5/20; B60L 5/18; B60L 5/22; B60L 5/24; B60L 5/26; B60L 5/28; B60L 5/00; B60L 5/02; B60L 2200/26
USPC ....... 191/59.1, 33 R, 66, 59, 45 R, 50, 55, 87, 191/90; 416/39; 244/134 R
See application file for complete search history.

(56) References Cited

U.S. PATENT DOCUMENTS

| | | | |
|---|---|---|---|
| 963,205 A | | 7/1910 | Brown et al. |
| 3,216,556 A | * | 11/1965 | Burgess, Jr. .................. 198/763 |
| 3,955,657 A | * | 5/1976 | Bossi ................................ 191/2 |
| 6,244,815 B1 | * | 6/2001 | Treat ............................ 415/54.1 |
| 2009/0120471 A1 | * | 5/2009 | Ludwiczak ............... 134/115 R |

FOREIGN PATENT DOCUMENTS

| | | |
|---|---|---|
| AU | 466464 | 3/1975 |
| CN | 202399926 | 8/2012 |
| JP | H09182204 | 11/1997 |
| JP | 2003-23701 | * 1/2008 |
| SU | 591339 | 2/1978 |

(Continued)

OTHER PUBLICATIONS

European Search Report completed on Apr. 14, 2014 for application EP14150961.2 filed on Jan. 13, 2014 in the name of TESMEC S.P.A.
Italian Search Report completed on Sep. 24, 2013 for Italian Application MI2013A000064 filed on Jan. 18, 2013 in the name of TESMEC S.P.A.

(Continued)

*Primary Examiner* — Mark Le
(74) *Attorney, Agent, or Firm* — Steinfl & Bruno LLP

(57) ABSTRACT

An ice breaking pantograph is described, having a sliding element moveable between an operative position where it is engaged to an overhead train or tram power line and a non-operative position where it is separated from the overhead power line; at least one arm, having a first end which can be hinged to a train or tram vehicle and a second end connected to the sliding element; an active actuator on the arm to move it in order to move the sliding element between the operative position and the non-operative position; a vibrator operating on the sliding element and activatable in the operative position of the sliding element to remove ice and/or snow from the overhead power line.

9 Claims, 2 Drawing Sheets

(56) References Cited

FOREIGN PATENT DOCUMENTS

| | | |
|---|---|---|
| SU | 1209478 | 2/1986 |
| SU | 1691163 | 11/1991 |
| UA | 69864 | 9/2004 |

OTHER PUBLICATIONS

Italian Search Opinion completed on Sep. 24, 2013 for Italian Application MI2013A000064 filed on Jan. 18, 2013 in the name of TESMEC S.P.A.

* cited by examiner

ICE BREAKING PANTOGRAPH

CROSS REFERENCE TO RELATED APPLICATIONS

The present application claims priority to Italian patent application MI2013A000064 filed on Jan. 18, 2013, which is incorporated herein by reference in its entirety.

FIELD

The present disclosure refers to an ice breaking pantograph. In particular, this disclosure applies to the removal of ice and snow from overhead train power lines so as to allow the circulation of trains even under harsh weather conditions. Likewise, the present disclosure advantageously applies to the removal of ice and/or snow from tram overhead power lines so as to restore the operation of trams and trolleybuses.

BACKGROUND

As known, the removal of ice from overhead power lines may occur manually through an operator using telescopic rods to shake the wires of the overhead power line, thus facilitating the breakage of the deposit of ice and the dropping thereof.

Evidently, not only is this method of removing ice definitely difficult and uncomfortable to achieve but it also exposes the operator to difficult work conditions. In addition, such method is particularly slow and inefficient.

In order to overcome these drawbacks, railway companies or public transport companies, which have the duty to keep the railway or tram lines operative, use electromotive pantographs which, sliding on the cables of the overhead power line, remove the deposit of ice.

The disadvantage of this method lies in the fact that the removal of ice and snow is not entirely efficient. Furthermore, this method utilizes a resource that is not explicitly designated for the purpose and which is thus not used for driving railway or tram carriages as it should.

Another method used for keeping the overhead power lines operative during the harsh winter conditions consists in providing the overhead power line with a heated cable superimposed on the electrical contact to melt the ice.

It is clear that this solution is efficient for suitably equipped power lines only. In addition, the cost of installing lines of this kind is extremely high.

SUMMARY

In this context, the technical task on which the present disclosure is based is to provide an ice breaking pantograph capable of overcoming the drawbacks of the prior art mentioned above.

In particular, embodiments of the present disclosure provide an ice breaking pantograph capable of allowing restoring the operation of a railway line or urban transport in an efficient and quick manner in case of harsh winter weather conditions.

According to an aspect of the present disclosure, an ice breaking pantograph is provided, comprising: a sliding element moveable between an operative position in which the sliding element is engaged to an overhead train or tram power line and a non-operative position in which the sliding element is separated from said overhead power line; at least one arm, having a first end which can be hinged to a train or tram vehicle and a second end connected to said sliding element; an active actuator on said arm to move said arm in order to move said sliding element between said operative position and said non-operative position; and a vibrator operating on the sliding element and activatable in the operative position of the sliding element to remove ice and/or snow from said overhead power line.

BRIEF DESCRIPTION OF THE DRAWINGS

Further characteristics and advantages of the present disclosure shall be more apparent from the exemplifying and non-limiting description of a preferred but non-exclusive embodiment of an ice breaking pantograph, as illustrated in the attached drawings wherein.

DETAILED DESCRIPTION

Figure 1:
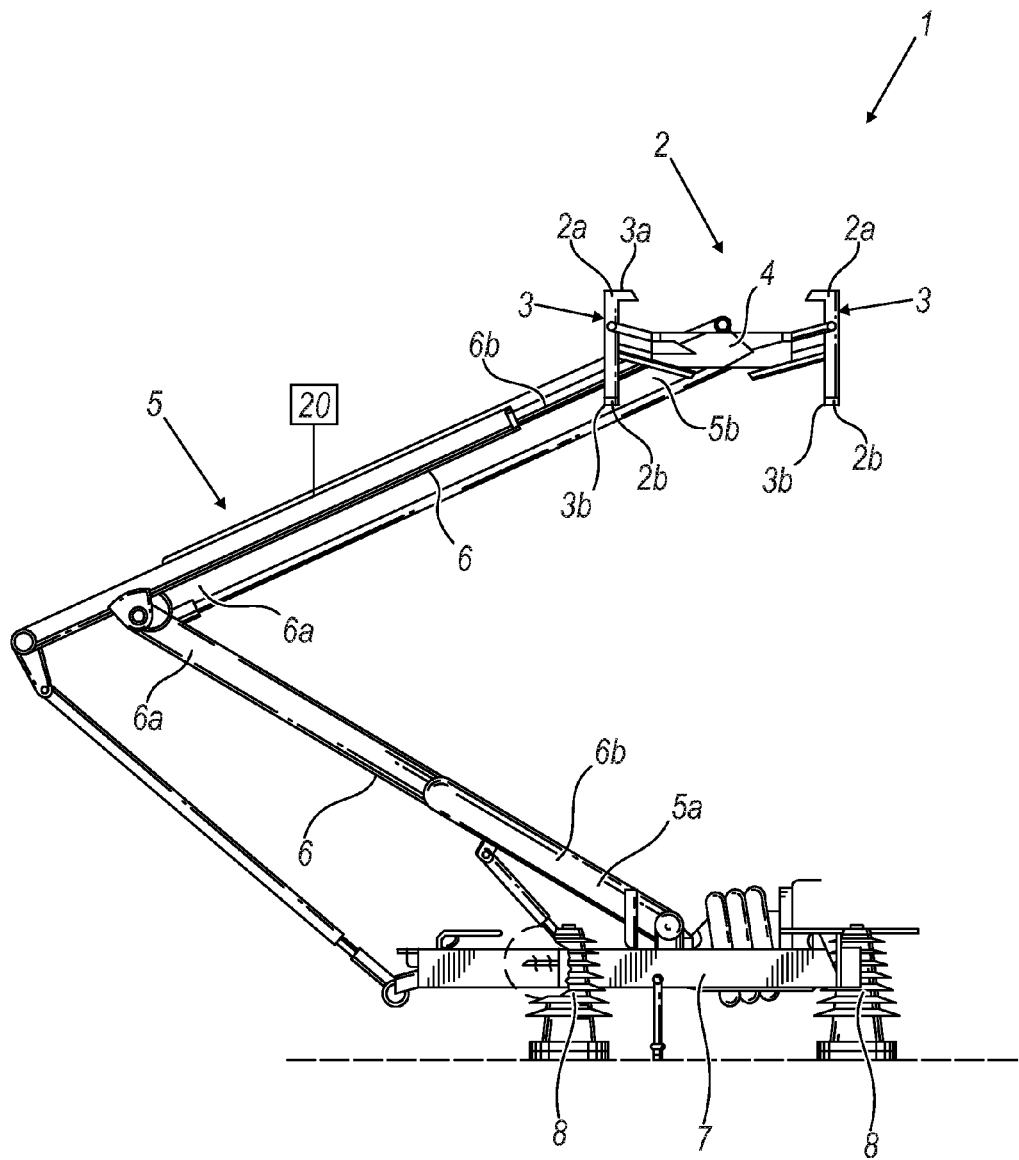
FIG. 1 is a perspective view of an ice breaking pantograph according to an embodiment of the present disclosure.
Figure 2:
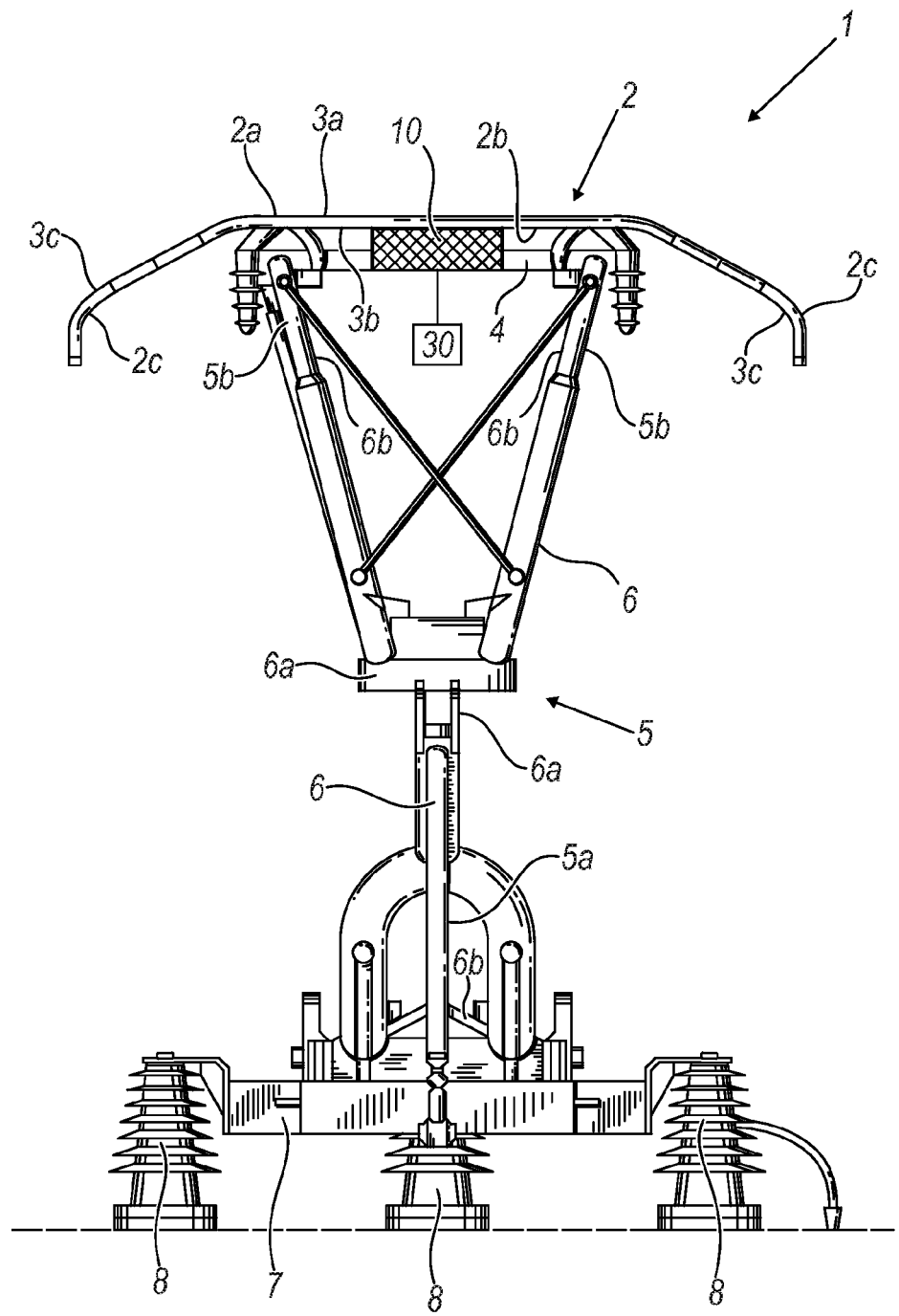
FIG. 2 is a front view of the pantograph of FIG. 1.

With reference to the attached figures, an ice breaking pantograph according to an embodiment of the present disclosure is indicated in its entirety with 1. The pantograph 1 comprises a sliding element 2, of a known type, moveable between an operative position and a non-operative position.

In the operative position the sliding element 2 is in contact with the electrified cable of a railway or tram overhead power line. In the non-operative position, the sliding element 2 is disconnected and moved away from the overhead power line.

The sliding element 2 has a contact surface 2a, which directly adheres to the overhead power line, and an opposite surface 2b. The sliding element 2 comprises two arched elements 3 having opposite ends 3c bent downwards, i.e. moving away from the overhead power line.

The arched elements 3, preferably identical to each other, are parallel to each other and rigidly constrained to each other by means of a connection body 4. Each arched element 3 has a respective contact surface 3a with the overhead power line and a respective opposite surface 3b. The contact surfaces 3a of the arched elements 3 correspond to the contact surface 2a of the sliding element 2. Analogously, the opposite surfaces 3b of the arched elements 3 correspond to the opposite surface 2b of the sliding element 2.

Preferably, the sliding element 2 is at least partly made of carbon or copper.

The pantograph 1 also comprises at least one arm 5 for moving the sliding element 3. In the preferred embodiment, the pantograph 1 has a single arm 5 (of a known type). In this case, the pantograph 1 is of the articulated single arm type. The arm 5 has a first end 5a rotatably associable to a train or tram vehicle, preferably to a framework fixed to the vehicle, and a second end 5b, opposite to the first, connected to the sliding element 2. In particular, the second end 5b of the arm 5 is connected to the connection body 4 of the sliding element 2.

The arm 5 comprises two pieces 6 rotatably connected to each other at the first ends 6a thereof. In detail, a piece 6 can be connected to the vehicle at a second end 6b thereof, while the other piece 6 is connected to the connection body 4 of the sliding element 2 at the second end 6b thereof.

The second end 6b of the piece 6 connectable to the vehicle corresponds to the first end 5a of the arm 5, while the second end 6b of the piece 6 connected to the sliding element 2 corresponds to the second end 5b of the arm 5.

Preferably, the second end 5b of the arm 5 is rotatably connected to the sliding element 2, so that the sliding element 2 is maintained parallel to itself in the operative position and in the non-operative position.

As shown in the figures, the pantograph 1 comprises a support structure 7 (of a known type) not fixable to the roof of the train or tram vehicle. The arm 5 is rotatably connected to the support structure 7 at the first end 5a.

A known actuator 20 is active on the pieces 6 of the arm 5 for moving it so as to move the sliding element 2 from the non-operative position to the operative position and vice versa.

The pantograph 1 further comprises a plurality of electrical insulators 8 which insulate it from the railcar on which it is installed. The electrical insulators 8, which are three in the illustrated embodiment, are provided to isolate electric voltages up to 25000 V. Thus, besides the conventional railway lines, the pantograph 1 may also be used on high speed railway lines. In particular, the insulators 8 are fixed to the support structure 7. In the preferred embodiment, the insulators 8 are also fixed to the roof of the vehicle.

In an alternative embodiment, not shown, the support structure 7 is mounted on a hydraulic linear actuator in turn mounted on the vehicle to move the pantograph 1 at the cables of the overhead power line.

The pantograph 1 further comprises a vibrator 10 operating on the sliding element 2. In detail, the vibrator 10 is active on the sliding element 2 when the sliding element 2 is at the operative position and, thus, at contact with the cable of the overhead power line.

The vibrator 10 is rigidly connected to the sliding element 2 so as to vibrate it. Such vibration is transmitted to the cable and facilitates the breaking and the subsequent dropping of the deposit of snow and ice.

Advantageously, the vibrator 10 is adjustable so that the frequency induced by the vibrator may be modified to make the vibration efficient, adapting it to the forward movement speed of the railway or tram vehicle.

Preferably, the vibrator 10 is a pneumatic vibrator. Even more preferably, the vibrator 10 is a turbine pneumatic vibrator. Regarding this, a pneumatic circuit (not shown) is connected to the vibrator 10 for the actuation thereof.

A valve 30 is arranged upstream of the vibrator 10. Such valve 30 is preferably a proportional valve and allows air pressure dosage at the inlet of the vibrator 10.

Thus, the speed of the turbine of the vibrator 10 and, hence, the frequency of the generated vibration can be adjusted.

Alternatively, the vibrator 10 is an electric vibrator. The vibration frequency is adjustable also in this case. For example, the vibration frequency may be modified by modifying the supply voltage of the vibrator 10. As mentioned, the vibration frequency may be adjusted as a function of the forward speed movement as well as the type of ice deposit to be eliminated.

The vibrator 10 is fixed to the sliding element 2. In particular, the vibrator 10 is fixed to the opposite surface 2b of the sliding element 2. More particularly, the vibrator 10 is fixed to one of the arched elements 3 at the surface 3b opposite to the contact surface 3a.

Alternatively, the pantograph 1 comprises two vibrators 10, each fixed at the opposite surfaces 3b of both arched elements 3. As a further alternative, the vibrator 10 may be fixed to the connection body 4.

In an embodiment, not shown in the figures, the pantograph 1 comprises a support on which the vibrator 10 is mounted. The support is a flat substantially rectangular or square-shaped element. The support is interposed between the sliding element 2 and the vibrator 10. The support is made of electrically insulating material and it is particularly advantageous when the vibrator 10 is electrical so as to protect it against any damage caused by electrical discharges.

A railway vehicle comprising a pantograph 1 according to the description outlined above is also part of the present disclosure. Such vehicle may comprise an engine for so as to be able to move along the railway line. Inside the vehicle, and in particular inside an operating cockpit, an actuator control is provided for lifting and lowering the sliding element 2 of the pantograph 1.

In addition, also in the operating cockpit, a control for the valve 30 is provided, for air pressure dosage at the inlet of the vibrator 10 in order to adjust the vibration frequency.

Alternatively, such railway vehicle does not comprise an engine. In such case, the vehicle is driven along the line by a specially provided driving means.

In addition, a tram on which the pantograph 1 is mounted for the removal of ice on overhead power lines for urban transport is also part of the present disclosure.

Lastly, a road vehicle comprising the pantograph 1 is also part of the present disclosure. Thus, ice may also be removed from urban overhead power lines used by trolleybuses.

According to several embodiments of the present disclosure, the pantograph is capable of efficiently and quickly removing ice and snow deposited on overhead power lines due to the action of the vibrator at contact with the cable.

The operating conditions of the operators are safeguarded given that they are only required to drive the vehicle.

In addition, the described pantograph is particularly versatile given that it can be successfully used in several fields, like the railway industry field or the urban transport field.

A number of embodiments of the disclosure have been described. The specific embodiments provided herein are examples of useful embodiments of the disclosure and it will be apparent to one skilled in the art that the disclosure can be carried out using a large number of variations of the pantograph set forth in the present description.

In particular, it will be understood that various modifications may be made without departing from the spirit and scope of the present disclosure. Accordingly, other embodiments are within the scope of the following claims.

The invention claimed is:

1. An ice breaking pantograph comprising:
   a sliding element moveable between an operative position in which the sliding element is engaged to an overhead train or tram power line and a non-operative position in which the sliding element is separated from said overhead power line;
   at least one arm, having a first end which can be hinged to a train or tram vehicle and a second end connected to said sliding element;
   an active actuator on said arm to move said arm in order to move said sliding element between said operative position and said non-operative position;
   a vibrator operating on the sliding element and activatable in the operative position of the sliding element to remove ice and/or snow from said overhead power line; and
   a support, made of electrically insulating material, with which said vibrator is in contact,
   wherein said vibrator is fixed to an opposite surface relative to a contact surface of said sliding element to the overhead train or tram power line.

2. The pantograph according to claim 1, wherein said vibrator is a pneumatic vibrator.

3. The pantograph according to claim 2, wherein the pneumatic vibrator is a turbine pneumatic vibrator.

4. The pantograph according to claim 1, wherein said vibrator is adjustable for adjusting a vibration frequency induced by said vibrator.

5. The pantograph according to claim 4, further comprising a proportional pneumatic valve arranged upstream of the vibrator for adjusting the vibration frequency.

6. The pantograph according to claim 1, wherein said arm is a single articulated arm.

7. The pantograph according to claim 1, further comprising a plurality of electrical insulators connected to said arm and connectable to said train or tram vehicle.

8. A train or tram vehicle comprising the ice breaking pantograph according to claim 1.

9. The pantograph according to claim 1, wherein said ice breaking pantograph is mounted on a vehicle and said vibrator is configured to change frequency according to a forward movement of the vehicle.

* * * * *